(12) United States Patent
Kim et al.

(10) Patent No.: US 10,173,376 B2
(45) Date of Patent: Jan. 8, 2019

(54) APPARATUS FOR LAMINATING FIBER TOW AND MANUFACTURING METHOD OF PRODUCT USING THE SAME

(71) Applicant: Hyundai Motor Company, Seoul (KR)

(72) Inventors: Min Soo Kim, Gyeonggi-Do (KR); Sang Sun Park, Gyeonggi-do (KR); Jun Hyoung Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 149 days.

(21) Appl. No.: 15/225,954

(22) Filed: Aug. 2, 2016

(65) Prior Publication Data

US 2017/0282465 A1   Oct. 5, 2017

(30) Foreign Application Priority Data

Apr. 5, 2016 (KR) .................. 10-2016-0041539

(51) Int. Cl.
*B29C 70/06* (2006.01)
*B29C 65/00* (2006.01)
*B29L 31/00* (2006.01)

(52) U.S. Cl.
CPC ............ *B29C 70/06* (2013.01); *B29C 65/002* (2013.01); *B29L 2031/721* (2013.01)

(58) Field of Classification Search
CPC .. B29C 65/002; B29C 70/06; B29L 2031/721
See application file for complete search history.

(56) References Cited

U.S. PATENT DOCUMENTS

| 5,700,347 A | 12/1997 | McCowin | |
|---|---|---|---|
| 2015/0314522 A1* | 11/2015 | Witzel | B29C 70/388 156/166 |
| 2016/0332394 A1* | 11/2016 | Chapman | B29C 70/384 |

FOREIGN PATENT DOCUMENTS

| JP | 2003-103554 A | 4/2003 |
|---|---|---|
| JP | 2004-066593 A | 3/2004 |
| JP | 2005-329593 A | 12/2005 |
| JP | 2007-030336 A | 2/2007 |
| JP | 2014-125285 A | 7/2014 |
| KR | 10-2010-0065498 A | 6/2010 |
| KR | 10-1323181 | 10/2013 |
| KR | 10-2015-0003314 A | 1/2015 |

* cited by examiner

*Primary Examiner* — Vishal I Patel
(74) *Attorney, Agent, or Firm* — Mintz Levin Cohn Ferris Glovsky and Popeo, P.C.; Peter F. Corless (57) ABSTRACT

An apparatus for laminating a fiber tow is provided. The apparatus includes a supply unit that supplies a fiber tow impregnated with resin. A laminating unit is configured to move along a surface of a lamination object and has a shock-absorption element to laminate a fiber tow supplied from the supply unit on a surface of the lamination object.

8 Claims, 7 Drawing Sheets

APPARATUS FOR LAMINATING FIBER TOW AND MANUFACTURING METHOD OF PRODUCT USING THE SAME

CROSS REFERENCE TO RELATED APPLICATION

The present application claims priority to Korean Patent Application No. 10-2016-0041539, filed Apr. 5, 2016, the entire contents of which are incorporated herein for all purposes by this reference.

BACKGROUND

(a) Field of the Invention

The present invention provides an apparatus for laminating a fiber tow that laminates a fiber tow while moving along a surface of an object to be laminated having a rounded portion and is configured to provide shock absorption.

(b) Description of the Related Art

Generally, apparatuses that laminate fiber tows have not included a shock-absorbing function. However, lamination of a fiber tow on a surface of a component using a single roller has a large diameter, thus being usable only with components that are flat or have a broad curvature. Accordingly, shock absorption has been used for large components such as the wings of an airplane and has proven difficult to apply to automotive components having sharp curves.

The above information disclosed in this section is merely for enhancement of understanding of the background of the invention and therefore it may contain information that does not form the prior art that is already known in this country to a person of ordinary skill in the art.

SUMMARY

The present invention provides an apparatus for laminating a fiber tow while moving along a surface of an object to be laminated which has a rounded portion and includes a shock-absorbing element.

According to one aspect an apparatus for laminating a fiber tow may include a supply unit configured to supply a fiber tow impregnated with resin and a laminating unit configured to move along a surface of a lamination object and configured to provide shock-absorption to laminate a fiber tow supplied from the supply unit on a surface of the lamination object. The supply unit may include a creel wound with a fiber tow, an impregnator configured to impregnate a fiber tow unrolled from the creel with resin and a cooler configured to solidify the resin in the fiber tow by a reduction of the resin temperature.

The laminating unit may include a body disposed over the lamination object and configured to move along a surface of the lamination object; a shock absorber having an upper end coupled to the body; a rotary shaft member coupled to a lower end of the shock absorber and having a rotary shaft disposed in a width direction of the body; and a pressing roller coupled to the rotary shaft member configured to rotate about the rotary shaft and laminate a fiber tow supplied from the supply unit on the surface of the lamination object by rolling. The shock absorber may include a rod that couples a bottom of the body and the rotary shaft member and extends downward a variable length from the bottom of the body and an elastic member that surrounds the rod between the bottom of the body and the rotary shaft member and includes elasticity for the rod. A plurality of shock absorbers, rotary shaft members and pressing rollers may be disposed and spaced in a longitudinal direction of the body. The shock absorbers may individually absorb shocks.

The laminating unit may further include an integrating roller that integrates a plurality of fiber tows supplied from the supply unit and guide the integrated fiber tows to the pressing roller. The laminating unit may further include a guiding roller disposed at a front of the body in a movement direction of the body and may be configured to guide a fiber tow supplied from the supply unit to a pressing roller. The integrating roller may be disposed above the guiding roller at the front of the body and may be configured to pass a fiber tow between the integrating roller and the guiding roller with tension in the fiber tow maintained. The laminating unit may further include a heater disposed ahead of body in a movement direction of the body and may be configured to heat resin in a fiber tow. The laminating unit may further include a rotary shaft coupled to the rear side of the body in a movement direction of the body arranged perpendicularly to a rotational axis of the pressing roller and rotating the body.

According to another aspect of the present invention, a manufacturing method of a product using an apparatus for laminating a fiber tow may include laminating a fiber tow on an interior side of a mold using an apparatus for laminating a fiber tow that includes a shock-absorption feature, forming a product in a desired shape by closing the mold and pressing the laminated tow and separating the formed product from the mold. A manufacturing method of a product using an apparatus for laminating a fiber tow may include laminating a fiber tow on a surface of a component formed of metal or plastic using an apparatus for laminating a fiber tow that includes a shock-absorption element. The component may be formed of plastic and may be partially reinforced by partially laminating the fiber tow on the surface of the part.

According to an apparatus for laminating a fiber tow of the present invention that includes a shock-absorbing function, a fiber tow may be laminated while moving along a surface of a lamination object having a curved portion. Further, a plurality of pressing rollers for laminating a fiber tow and a plurality of shock absorbers are provided and may be configured to move individually to laminate a fiber tow on a surface of a lamination object without a gap.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, exemplary embodiments of the present invention will be described in detail with reference to the accompanying drawings.

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
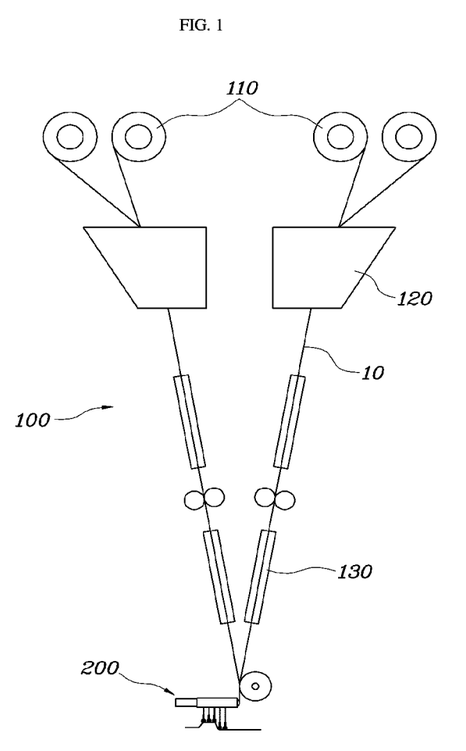
FIG. 1 is an exemplary view schematically showing an apparatus for laminating a fiber tow according to an exemplary embodiment of the present invention.
Figure 2:
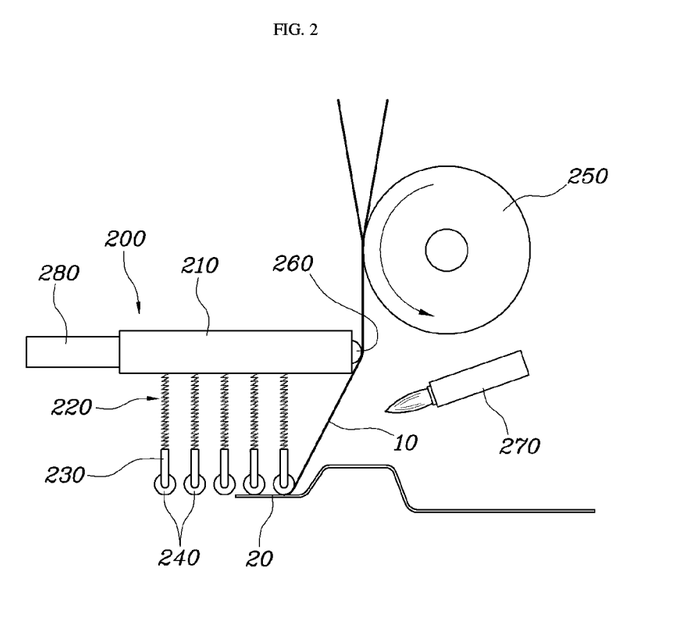
FIG. 2 is an exemplary view showing the operation of a laminating unit according to an exemplary embodiment of the present invention.
Figure 3:
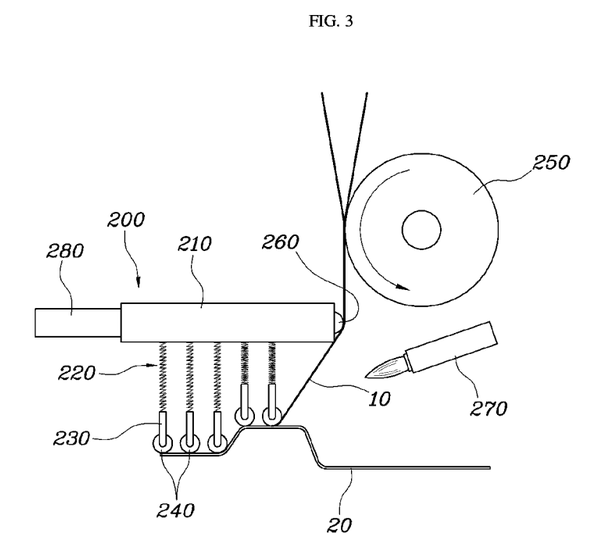
FIG. 3 is an exemplary view showing the operation of the laminating unit according to an exemplary embodiment of the present invention.
Figure 4:
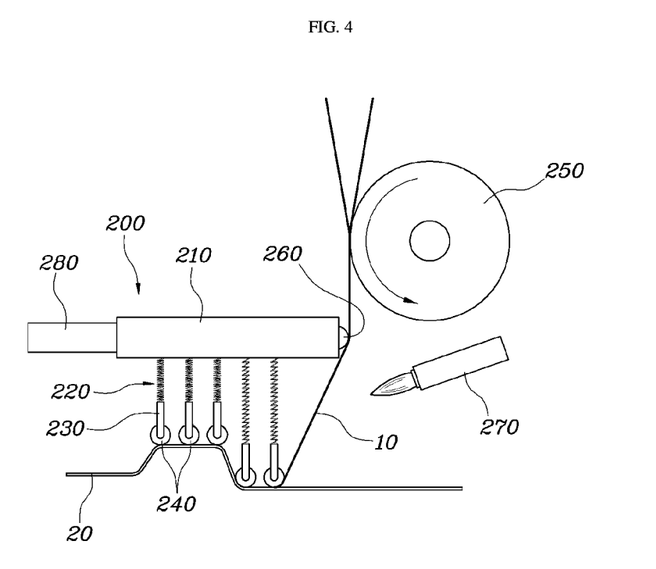
FIG. 4 is an exemplary view showing the operation of a laminating unit according to an exemplary embodiment of the present invention.

An apparatus for laminating a fiber tow according to the present invention, as shown in FIG. 1, may include a supply unit 100 configured to supply a fiber tow 10 impregnated with resin and a laminating unit 200 configured to absorb a shock for lamination of the fiber tow 10 supplied from the supply unit 100 on a lamination object 20 while moving on the lamination object 20. The fiber tow 1 may include a filament, a fiber, a tow with a plurality of fibers, and a fiber tape. The fiber of the fiber tow 10 may be a high-strength fiber such as a carbon fiber, a glass fiber, a hard fiber such as an aramid fiber, but is not limited thereto. The lamination object 20 may include an object to be laminated and may be a component or a mold. However, the lamination object is not limited thereto.

The supply unit 100 that may include a component to supply the fiber tow 10, may include a creel 110 wound with a fiber tow 10, an impregnator 120 configured to apply the fiber tow 10 unrolled from the creel 110 impregnated with resin, and a cooler 130 configured to solidify the resin in the fiber tow 10 by cooling the temperature. The fiber tow 10 may be wound around the creel 110 and the creel 110 may be configured to rotate about a shaft with a fixed position, the fiber tow 10 may be unrolled and supplied. The fiber tow 10 unrolled from the creel 110 may be configured to move to the impregnator 120. The impregnator 120 may have an interior cavity that stores the resin, a top aperture in the top through which the fiber tow 10 unrolled from the creel 110 enters the interior cavity and a bottom aperture in the bottom through which the fiber tow 10 that has been impregnated with resin while passing through the interior cavity exits. The bottom hole may be sized to allow the fiber tow 10 impregnated with resin to pass there through to prevent leakage of the resin (e.g., the aperture may correspond to the size of the resin).

The resin in the impregnators 120, which may include resin that is not hardened yet, may be thermoplastic resin such as polypropylene (PP), polyamide (PA6), polyethylene (PE), and polycarbonate (PC) or thermosetting resin such as epoxy, polyurethane, and acryl, but is not limited thereto. An exemplary embodiment may include when a plurality of creels 110 are provided for each of the impregnator 120, the fiber tows 10 unrolled from the creels 110 may be primarily integrated through the impregnator 120. The impregnator 120 may further include rollers that firmly combine the fiber tows 10 that are primarily integrated through the impregnator 120.

Further, a cutter configured to cut a fiber tow 10 may be further included. When a fiber tow 10 finishes being laminated in one direction, the fiber tow 10 may be cut in order to laminate the surface of the lamination object 20, which is not laminated yet in that direction. Alternately, the surface of the lamination object 20 may be laminated another direction. The fiber tow 10 impregnated with resin may be configured to move through the cooler 130, whereby the resin may decrease in temperature and may be solidified (e.g., hardened) to a predetermined degree of hardness. The resin hardened to a predetermined degree of hardness may decrease in fluidity, and may not be separated from the fiber tow 10. When a prepreg impregnated in resin in advance is used to laminate the surface of the lamination object 20, the temperature of the entire prepreg may be maintained at a predetermined level or less to prevent the prepreg from hardening. However, in the present invention the temperature of a fiber tow 10 impregnated with resin may be immediately reduced, and t the energy efficiency may be improved and the manufacturing costs may be reduced.

The laminating unit 200, as shown in FIGS. 2 to 5, may be configured to laminate a fiber tow 10 supplied from the supply unit 110 on the surface of the lamination object 20.

The fiber tow 10 supplied from the supply unit 100 may be impregnated with resin and may include several layers. In particular, the laminating unit 200 may include a body 210 disposed over the lamination object 20 and configured to move along the surface of the lamination object 20, a shock absorber 220 that has an upper end coupled to the body 210, a rotary shaft member 230 coupled to the lower end of the shock absorber 220 and has a rotary shaft disposed in the width direction of the body 210 and a pressing roller 240 coupled to the rotary shaft member 230 and configured to rotate about the rotary shaft and laminate the fiber tow 10 supplied from the supply unit 100 on the surface of the lamination object 20 by rolling. The body 210 may be separated from the surface of the lamination object 20 and may be configured to move along the surface of the lamination object 20 to be laminated with the fiber tow 10. The bottom of the body 210 may be disposed adjacent to the surface of the lamination object 20.

The pressing roller 240 may be disposed in the width direction of the body 210 and may be configured to laminate the fiber tow 10 supplied from the supply unit 100 on the surface the lamination object 20. The fiber tow 10 may be supplied between the pressing roller 240 and the surface of the lamination object 20 and as the pressing roller 240 rolls, the fiber tow 10 may be laminated on the surface of the lamination object 20 and another fiber tow 10 may be supplied from the supply unit 100. The pressing roller 240 may include various diameters, in some exemplary embodiments the pressing roller may have a diameter of about 10 mm or less, to more efficiently match curved portions of the surface of the lamination object 20, as compared to using one large roller to laminate the fiber tow 10 on the surface of the lamination object 20. Accordingly, the fiber tow 10 may be laminated on the surface of the lamination object 20. The pressing roller 240 may be coupled to the rotary shaft member 230 and the rotary shaft member 230 may include a shaft configured to press roller 240 and roll the pressing roller 240 about the rotary shaft on the surface of the lamination object 20.

The shock absorber 220 may be configured to horizontally move the body 210 without a height adjustment even when the pressing roller 240 is configured to move over a curved portion of the surface of the lamination object 20 while rolling on the surface of the lamination object 20 with movement of the body 210. Further, the shock absorber 220 may be configured to adjust the rotary shaft member 230 and the pressing roller in a vertically integrated manner. Accordingly, the pressing roller 240 may firmly laminate the fiber tow 10 on the surface of the lamination object 20 having curved portions. The rotary shaft member 230 and the pressing roller 240 may be separably coupled to the shock absorber 220. In particular, the diameter and number of pressing rollers 240 may be adjusted in accordance with curved portions of the surface of the lamination object 20.

In further exemplary embodiments, the shock absorber 220 may include a rod 221 that connects the bottom of the body 210 and the rotary shaft member 230 that may extend downward a variable length from the bottom of the body 210 and an elastic member 222 that surrounds the rod 221 between the bottom of the body 210 and the rotary shaft member 230 and may be configured to provide elasticity for the rod 221. The rod 221 may adjust the distance from the bottom of the body 210, when the pressing roller 240 moves over a curved portion of the surface of the lamination object 20, the vertical position of the rotary shaft member 230 and the pressing roller 240 may be adjusted, without a change in the height of the body 210.

Figure 5:
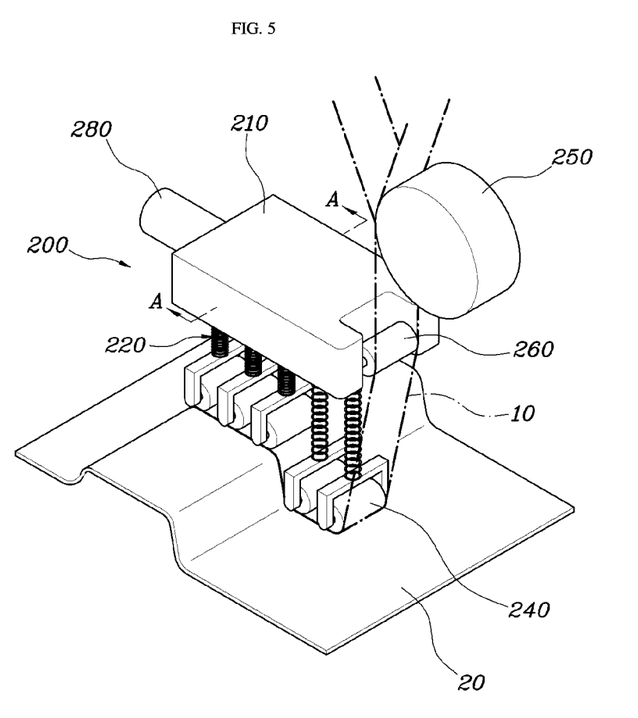
FIG. 5 is an exemplary view showing the laminating unit according to an exemplary embodiment of the present invention.
Figure 6:
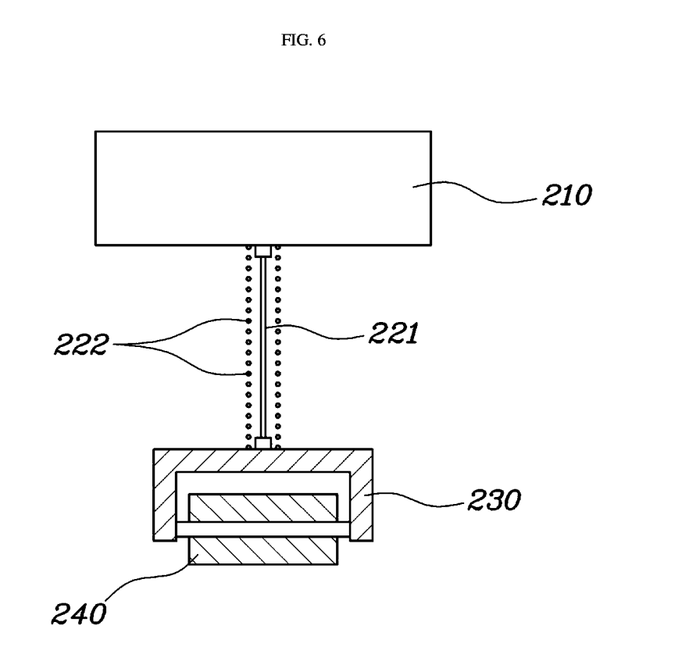
FIG. 6 is an exemplary cross-sectional view of the laminating unit according to an exemplary embodiment of the present invention.

As in FIG. 6 showing an exemplary cross-section taken along line A-A shown in FIG. 5, since the elastic member 222 that surrounds the rod 221 is disposed between the bottom of the body 210 and the rotary shaft member 230, when the pressing roller 240 moves over an upward projection of the surface of the lamination object 20 the elastic member 222 may be configured to contract and cause the rod 221 to retract. Further, when the pressing roller 240 moves over a downward projection of the surface of the lamination object 20 the elastic member 222 may be configured to return to an initial shape and the rod 221 stretches. The elastic member 222 may be a spring and the pressing roller 240 may be pressed against the lamination object 20 by the elasticity of the elastic member 222. In particular, the pressing roller 240 may laminate the lamination object with the fiber tow 10 under pressure. A plurality of shock absorbers 220, rotary shaft members 230 and pressing rollers 240 may be provided and spaced apart in the longitudinal direction of the body 210 and the shock absorbers 220 may be configured to individually absorb shocks. To laminate the fiber tow 10 on the surface of the lamination object 20 without a gap therebetween, the shock absorber 220, the rotary shaft member 230, and the roller 240 may be configured as a first set and spaced from the bottom of the body 210. Further, the shock absorbers 220 may be configured to individually absorb shocks when the rollers 240 move over a curved portion of the surface of the lamination object 20.

The laminating unit 200 may further include an integrating roller 250 configured to integrate a plurality of fiber tows 10 supplied from the supply unit 100 and guide the integrated fiber tows 10 to a pressing roller 240. When the supply unit 100 includes a plurality of creels 110, impregnators 120 and coolers 130, a plurality of fiber tows 10 may be configured to pass through the impregnators 120 and the coolers 130 using the integrating roller 250 and may be configured to guide the integrated tows 10 to the pressing rollers 240 that may be integrated to smoothly supply the fiber tows 10.

The laminating unit 200 may further include a guiding roller 260 disposed at the front of the body 210 in the movement direction of the body 210 and may be configured to guide a fiber tow supplied from the supply unit 100 to a pressing roller 240. The guiding roller 260 may include a rotary shaft disposed in the width direction of the body 210, similar to the pressing roller 240. Accordingly, a fiber tow 10 supplied from the supply unit 100 may be configured to guide a pressing roller 240 by rolling. Further, damage to a fiber tow 10 may be prevented due to interference between the fiber tow 10 and the lower end of the front of the body 210. The integrating roller 250 may be disposed above the guiding roller 260 at the front of the body 210 and may pass fiber tows 10 between the integrating roller 250 and the guiding roller 260 while maintaining the tension in the fiber tows 10.

As shown in FIG. 5, since the integrating roller 250 and the guiding roller 260 are not aligned and fiber tows 10 pass between the integrating roller 250 and the guiding roller 260 the rollers may guide the fiber tows 10 to a pressing roller 240 while maintaining the tension in the fiber tows 10 maintained. Accordingly, the fiber tows 10 may be more smoothly laminated on the surface of the lamination object 20. The laminating unit 200 may further include a heater 270 disposed ahead of the body 210 in the movement direction of the body 210 and may be configured to heat resin in a fiber tow 10. As described above, the fiber tows 10 may be supplied with resin impregnated to the laminating unit 200. When the resin is thermoplastic resin such as polypropylene (PP), polyamide (PA6), polyethylene (PE), and polycarbonate (PC the fluidity of the resin may be increased by heating the resin to more smoothly laminate a fiber tow 10 on the surface of the lamination object 20.

The laminating unit 200 may further include a pivot shaft 280 coupled to the rear side of the body 210 in the movement direction of the body 210 may be disposed perpendicular to the rotational axis of the pressing roller 240 and may be configured to rotate the body 210. The body 210 may be coupled to a fixing body (not shown) and the body 210 and the fixing body (not shown) may be adjusted to laminate a fiber tow 10. The body 210 and the fixing body (not shown) may be connected by the pivot shaft 280 and the pivot shaft 280 may include a rotational axis perpendicular to the rotational axis of the pressing roller 240. Since the body 210 may be rotated by the pivot shaft 280, the fiber tow 10 on the surface of the lamination object 20 may be laminated through the pressing roller 240 by rotating the body 210 when a curved portion of the surface of the lamination object 20 is inclined in the movement direction of the body 210 or when a curved portion is inclined perpendicularly to the movement direction of the body 210.

A manufacturing method of a product using the apparatus for laminating a fiber tow may include laminating a fiber tow 10 on the interior surface of a mold using an apparatus for laminating a fiber tow that includes a shock-absorption element, forming a product in a desired shape by closing the mold and pressing the laminated tow 10 and separating the formed product from the mold. According to another exemplary embodiment of the manufacturing method of a product using an apparatus for laminating a fiber tow, the method may further include laminating a fiber tow 10 on a surface of a metal or plastic part using an apparatus for laminating a fiber tow having a shock-absorption element. Further, the component may be formed from plastic and may be partially reinforced by partially laminating the fiber tow 10 on the surface of the component.

Accordingly, hereafter, exemplary embodiments of an apparatus for laminating a fiber tow according to the present invention will be described, and a partition panel formed from a composite partially reinforced by an apparatus for laminating a fiber tow according to an exemplary embodiment of the present invention and a partition panel formed from a composite manufactured by a method of the present invention will be compared.

Embodiment

According to a first exemplary embodiment that may be configured to laminate a lamination object 20 with a fiber tow 10 made of carbon fibers, a mold may be opened and a fiber tow 10 may be laminated on the interior surface of the mold using an apparatus for laminating a fiber tow according to the present invention. After completion of the lamination, the mold may be closed and then the laminated fiber tow 10 may be pressed, to a product in a desired shape. In particular, to provide improved separation of a product from the mold, a separation spray may be applied on the interior surface of the mold before laminating the fiber tow 10 on the interior surface of the mold.

According to a second exemplary embodiment to lamination a fiber tow 10 formed from carbon fibers on a surface of a part made of steel, a fiber tow 10 may be laminated on a surface of a component formed of steel using an apparatus for laminating a fiber tow according to the present invention. In particular, a rust preventive oil may be applied to prevent the metal from rusting after lamination of the fiber tow 10.

According to a third exemplary embodiment configured to laminate a fiber tow 10 formed from a thermoplastic material on a surface of a component made of steel, a fiber tow 10 may be laminated at a portion that requires reinforcement on a surface of a component formed of a thermoplastic material using an apparatus for laminating a fiber tow according to the present invention.

According to a fourth exemplary embodiment a product may be manufactured in the same way as in the previous exemplary embodiments and a fiber tow 10 may be selectively laminated at sections requiring several layers using an apparatus for laminating a fiber tow according to the present invention.

Embodiment & Comparative Example

Figure 7:
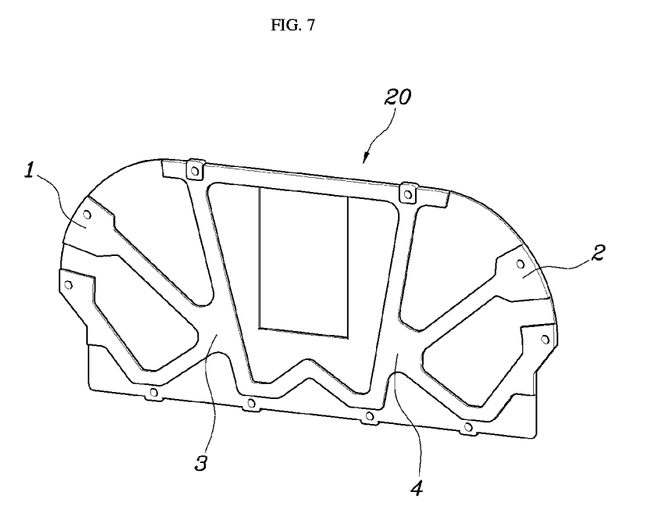
FIG. 7 is an exemplary view showing a partition panel laminated with a fiber tow according to an exemplary embodiment of the present invention.

In an exemplary embodiment, similar to the third exemplary embodiment a partition panel laminated with a fiber tow 10 made of carbon fibers as shown in FIG. 7, was manufactured using an apparatus for laminating a fiber tow according to the present invention by manufacturing a 30 component formed from a composite material by laminating glass fiber that is relatively inexpensive in directions of 0°, 90°, 90°, and 0° and then injecting polypropylene resin. In a comparative example, a partition panel was manufactured by laminating a carbon fiber that is relatively expensive in direction of 0°, 90°, 90°, and 0° and the injecting polypropylene resin. Displacement due to torsional load in the exemplary embodiment and the comparative example is shown in Table 1.

TABLE 1

|  | Displacment at portion 1 | Displacement at portion 2 | Displacement at portion 3 | Displacement at portion 4 |
| --- | --- | --- | --- | --- |
| Exemplary embodiment | 0.2696 mm | 0.2741 mm | 0.1673 mm | 0.1641 mm |
| Comparative example | 0.2612 mm | 0.2600 mm | 0.1527 mm | 0.1525 mm |

As shown in Table 1, the displacement due to torsional load was relatively uniform in the exemplary embodiment in comparison to the comparative example. However, the manufacturing cost were greater for the comparative example than for the exemplary embodiment and thus the exemplary embodiment was half the cost to produce.

Although the present invention was described with reference to specific exemplary embodiments shown in the drawings, it is apparent to those skilled in the art that the present invention may be changed and modified in various ways without departing from the scope of the present invention, which is described in the following claims.

What is claimed is:
1. An apparatus for laminating a fiber tow, comprising:
a supply unit configured to supply the fiber tow impregnated with resin; and
a laminating unit configured to move along a surface of a lamination object and configured to provide shock-absorption to laminate the fiber tow supplied from the supply unit on the surface of the lamination object, wherein the laminating unit includes:
a body disposed over the lamination object and configured to move along the surface of the lamination object;
a shock absorber having an upper end coupled to the body;

a rotary shaft member coupled to a lower end of the shock absorber and having a rotary shaft disposed in a width direction of the body;

a pressing roller coupled to the rotary shaft member and configured to rotate about the rotary shaft and laminate the fiber tow supplied from the supply unit on the surface of the lamination object via a rotational movement; and a pivot shaft coupled to the rear side of the body in a movement direction of the body, arranged perpendicularly to a rotational axis of the pressing roller, and configured to rotate the body.

2. The apparatus of claim 1, wherein the supply unit includes:

a creel wound with the fiber tow;

an impregnator configured to impregnate the fiber tow unrolled from the creel with the resin; and a cooler configured to solidify the resin in the fiber tow by a reduction of temperature of the resin.

3. The apparatus of claim 1, wherein the shock absorber includes:

a rod coupled to a bottom of the body and the rotary shaft member and that extends downward a variable length from the bottom of the body; and an elastic member that surrounds the rod disposed between the bottom of the body and the rotary shaft member and configured to provide elasticity for the rod.

4. The apparatus of claim 3, wherein a plurality of shock absorbers, rotary shaft members, and pressing rollers are disposed and spaced in a longitudinal direction of the body, and wherein the shock absorbers are configured to individually absorb shocks.

5. The apparatus of claim 1, wherein the laminating unit further includes, an integrating roller configured to integrate a plurality of fiber tows supplied from the supply unit and guide the integrated fiber tows to the pressing roller.

6. The apparatus of claim 5, wherein the laminating unit further includes a guiding roller disposed at a front of the body in a movement direction of the body and configured to guide the fiber tow supplied from the supply unit to the pressing roller.

7. The apparatus of claim 6, wherein the integrating roller is disposed above the guiding roller at the front of the body and is configured to pass the fiber tow between the integrating roller and the guiding roller while maintaining tension in the fiber tow.

8. The apparatus of claim 1, wherein the laminating unit further includes a heater disposed ahead of the body in a movement direction of the body and configured to heat the resin in the fiber tow.

* * * * *